(12) United States Patent
Liu et al.

(10) Patent No.: US 7,336,479 B2
(45) Date of Patent: Feb. 26, 2008

(54) MONITOR ADJUSTING APPARATUS

(75) Inventors: Alive (Chien-Chung) Liu, Tu-Chen (TW); Chen Lu Fan, Tu-Chen (TW); Li-Ping Chen, Tu-chen (TW)

(73) Assignee: Hon Hai Precision Ind. Co., Ltd, Taipei Hsien (TW)

( * ) Notice: Subject to any disclaimer, the term of this patent is extended or adjusted under 35 U.S.C. 154(b) by 288 days.

(21) Appl. No.: 10/935,816

(22) Filed: Sep. 7, 2004

(65) Prior Publication Data

US 2005/0082459 A1   Apr. 21, 2005

(30) Foreign Application Priority Data

Sep. 5, 2003  (TW) .............................. 92216124 U (51) Int. Cl.
*G06F 1/00* (2006.01)
(52) U.S. Cl. ...................................... 361/681; 248/921
(58) Field of Classification Search ........ 248/917–924, 248/284.1, 291.1, 371, 372.1; 361/681–683; 16/285, 306, 307
See application file for complete search history.

(56) References Cited

U.S. PATENT DOCUMENTS

| | | | |
|---|---|---|---|
| 5,812,368 A * | 9/1998 | Chen et al. ................. | 361/681 |
| 5,895,022 A | 4/1999 | Kim | |
| 6,378,830 B1 * | 4/2002 | Lu ........................... | 248/278.1 |
| 6,581,893 B1 * | 6/2003 | Lu ........................... | 248/291.1 |
| 6,666,422 B1 * | 12/2003 | Lu et al. ................... | 248/291.1 |
| 6,796,541 B2 * | 9/2004 | Lu ........................... | 248/291.1 |
| 6,822,857 B2 * | 11/2004 | Jung et al. .................. | 361/681 |
| 6,912,120 B2 * | 6/2005 | Kim et al. .................. | 361/681 |
| 7,061,753 B2 * | 6/2006 | Michoux et al. ............ | 361/681 |
| 7,072,175 B2 * | 7/2006 | Ho .............................. | 361/681 |

FOREIGN PATENT DOCUMENTS

| | | |
|---|---|---|
| TW | 090217779 | 9/2002 |
| TW | 091208450 | 5/2003 |

\* cited by examiner

*Primary Examiner*—Carl D. Friedman
*Assistant Examiner*—Steven Marsh
(74) *Attorney, Agent, or Firm*—Wei Te Chung (57) ABSTRACT

A monitor adjusting apparatus include a monitor (10), a base (20) and an adjusting device (30). The adjusting device includes a first pivot assembly (40) connected with the monitor, a second pivot assembly (50) connected with the base, and a connecting assembly (70) mounted between the first pivot assembly and the second pivot assembly. The first pivot assembly generates a friction moment. The monitor generates a first gravity moment opposite to the friction moment. The second pivot assembly generates a twist moment. The monitor and the connecting assembly generate a second gravity moment opposite to the twist moment. The monitor stays at any obliquity under a balance of the friction moment and the first gravity moment, and stays at any height under a balance of the twist moment and the second gravity moment.

19 Claims, 8 Drawing Sheets

MONITOR ADJUSTING APPARATUS

BACKGROUND OF THE INVENTION

1. Field of the Invention

The present invention relates to a monitor adjusting apparatus, and particularly to a monitor adjusting apparatus which can stably and smoothly adjusting the obliquity and the height of the monitor.

2. Description of the Related Art

As the technology of the monitor developing, the monitor becomes smaller and smaller in cubage and lighter and lighter in weight. Therefore a device is assembled thereon for adjusting the obliquity or the height of the monitor.

A conventional adjusting device is disclosed in Taiwan Patent Application No. 091208450. The adjusting device comprises a connecting board secured to a back of the monitor, a plate secured to a supporting base, a passive device secured to the connecting board and pivoted attached to the plate, and an active device. The active device is assembled to the plate and drives the passive device. Therefore the connecting board is driven by the passive device to rotate around the supporting base. Thus the obliquity of the monitor is adjusted. But the adjusting device cannot adjust the height of the monitor.

Another conventional adjusting device is disclosed in Taiwan Patent Application No. 090217779. The adjusting device comprises a base and a supporting part with an arc-shaped structure. The supporting part is assembled on the base and extends upwardly from the base with a radian. A guide groove is formed on the upper surface of the supporting part. A screw seat of a monitor can slide in the guide groove and is fastened at different locations. Thus the location of the monitor is adjusted. But the obliquity of the monitor and the height of the monitor cannot be adjusted separately, that is, the monitor has a settled obliquity at one location. This makes the adjusting process relatively inconvenient.

Thus, an improved adjusting device which overcomes the above-mentioned problems is desired.

BRIEF SUMMARY OF THE INVENTION

Accordingly, an object of the present invention is to provide a monitor adjusting apparatus which can stably and smoothly adjusting the obliquity and the height of the monitor.

Another object of the present invention is to provide a monitor adjusting assembly, in which the obliquity and the height of the monitor can be adjusted separately.

To achieve the above-mentioned objects, a monitor adjusting apparatus comprising a monitor, a base and a connecting assembly. The connecting assembly comprises a first pivot assembly connected with the monitor, a second pivot assembly connected with the base, and a connecting assembly mounted between the first pivot assembly and the second pivot assembly. The first pivot assembly comprises a pair of supporting boards, a pivoting board, and a plurality of friction gaskets mounted between the supporting board and the pivoting board. The friction gaskets rub by the supporting board and the pivoting board and generate a friction moment. The monitor generates a first gravity moment opposite to the friction moment. The second pivot assembly comprises a torque-limiting spring with two clasp ends. One clasp end engages with the second pivot assembly and the other clasp end engage with the connecting assembly. The torque-limiting spring generates a twist moment under an action of the connecting assembly and the second pivot assembly. The monitor and the connecting assembly generate a second gravity moment opposite to the twist moment. The monitor stays at any obliquity under a balance of the friction moment and the first gravity moment, and stays at any height under a balance of the twist moment and the second gravity moment.

Other objects, advantages and novel features of the present invention will be drawn from the following detailed description of a preferred embodiment of the present invention with the attached drawings, in which:

DETAILED DESCRIPTION OF THE INVENTION

Figure 1:
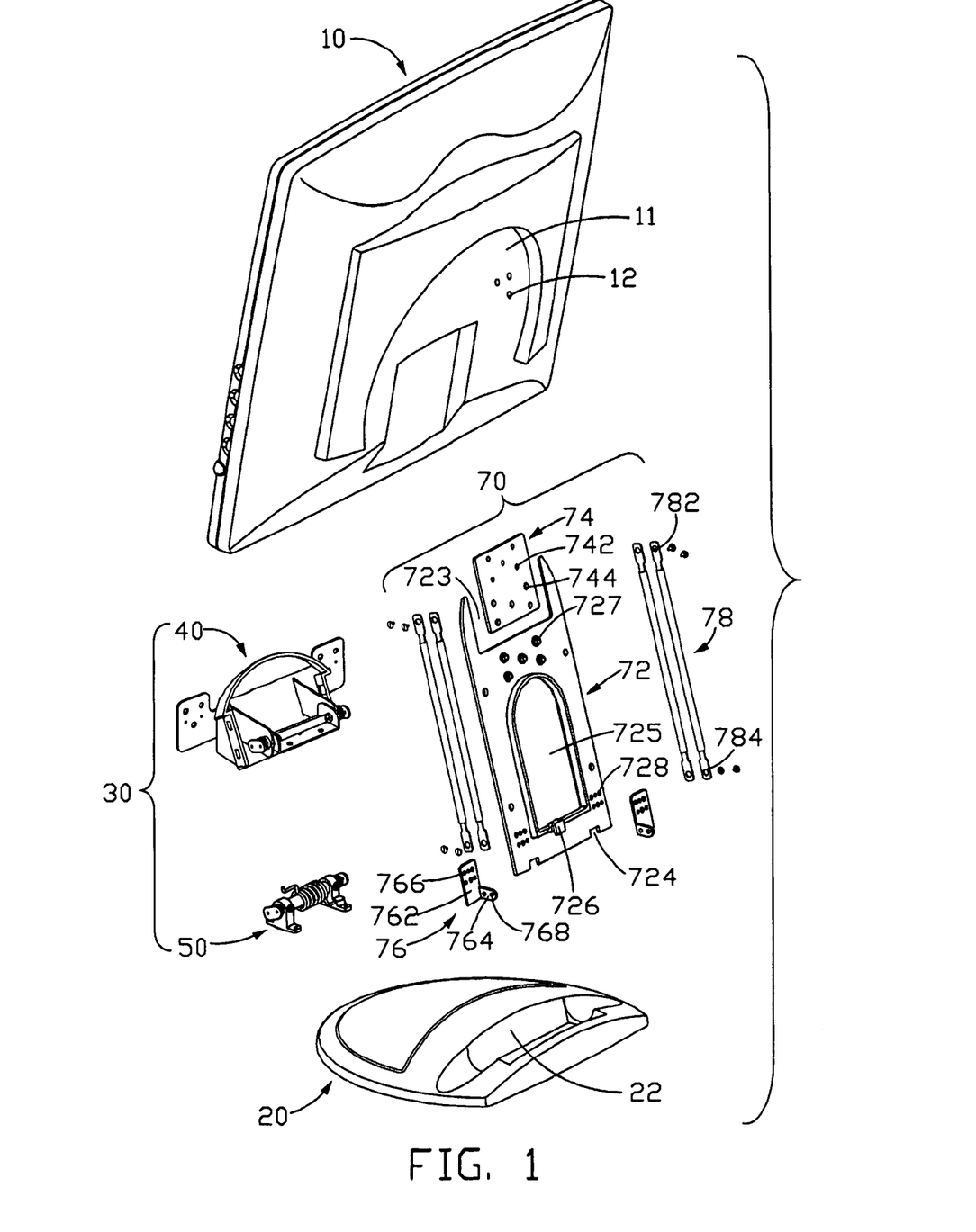
FIG. 1 is an exploded, perspective view of an adjusting device in accordance with the preferred embodiment of the present invention, together with a monitor and a base.

Referring to FIG. 1, an adjusting device 30 in accordance with a preferred embodiment of the present invention is connected to a base 20, and used for adjustably supporting a monitor 10. The adjusting device 30 is positioned between the monitor 10 and the base 20 for adjusting an obliquity and a height of the monitor 10 relative to the base 20.

A recess 11 is defined in a back of the monitor 10. A plurality of threaded holes 12 is defined in the recess 11. A groove 22 is located in a rear portion of the base 20, and a plurality of locking holes (not shown) is defined in the groove 22. The adjusting device 30 comprises a first pivot assembly 40, a second pivot assembly 50, and a connecting assembly 70 for connecting the first pivot assembly 40 and the second pivot assembly 50 together.

Figure 2:
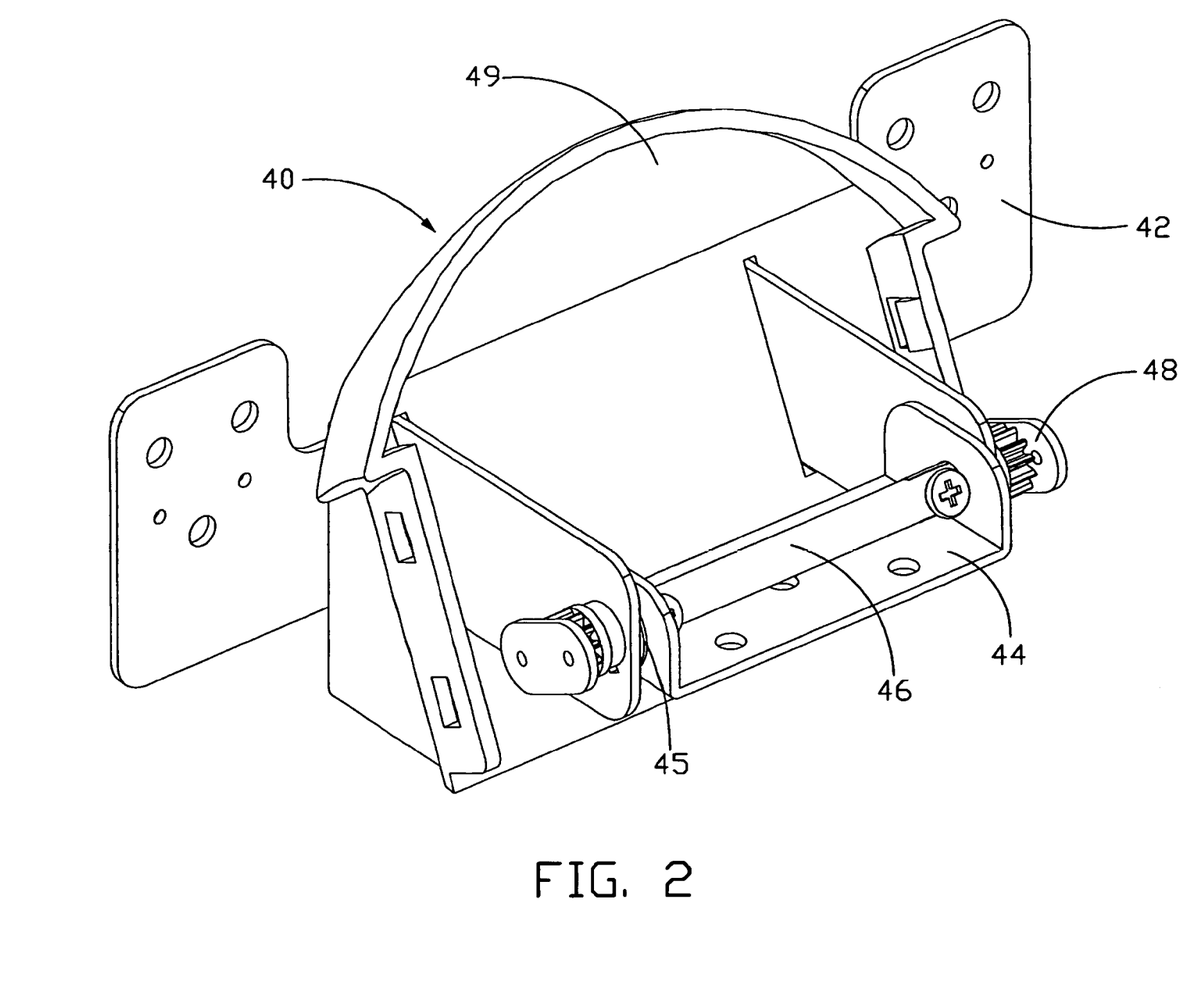
FIG. 2 is an enlarged view of a first pivot assembly of the adjusting device of FIG. 1.
Figure 3:
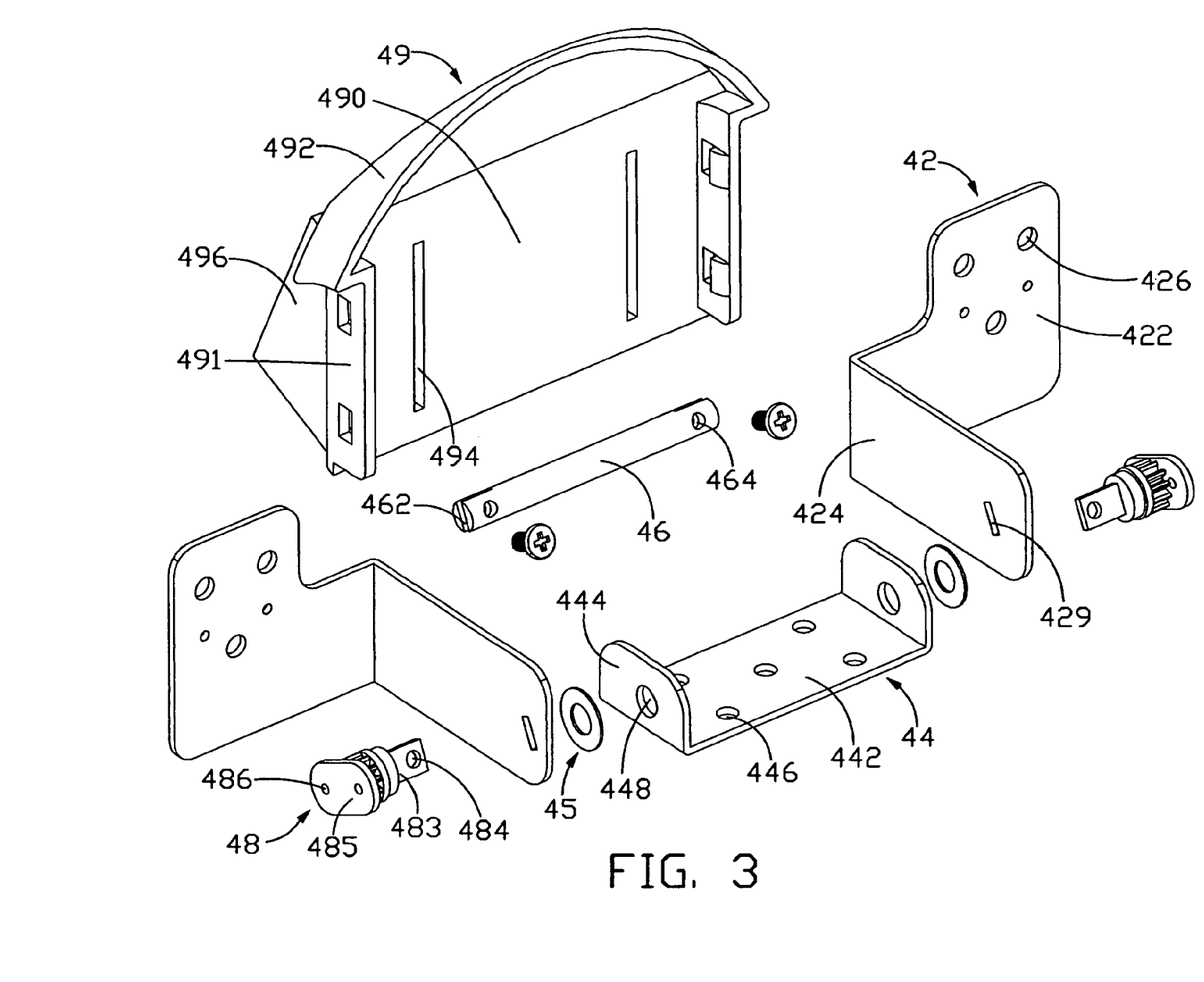
FIG. 3 is an exploded perspective view of the first pivot assembly of FIG. 2.
Figure 4:
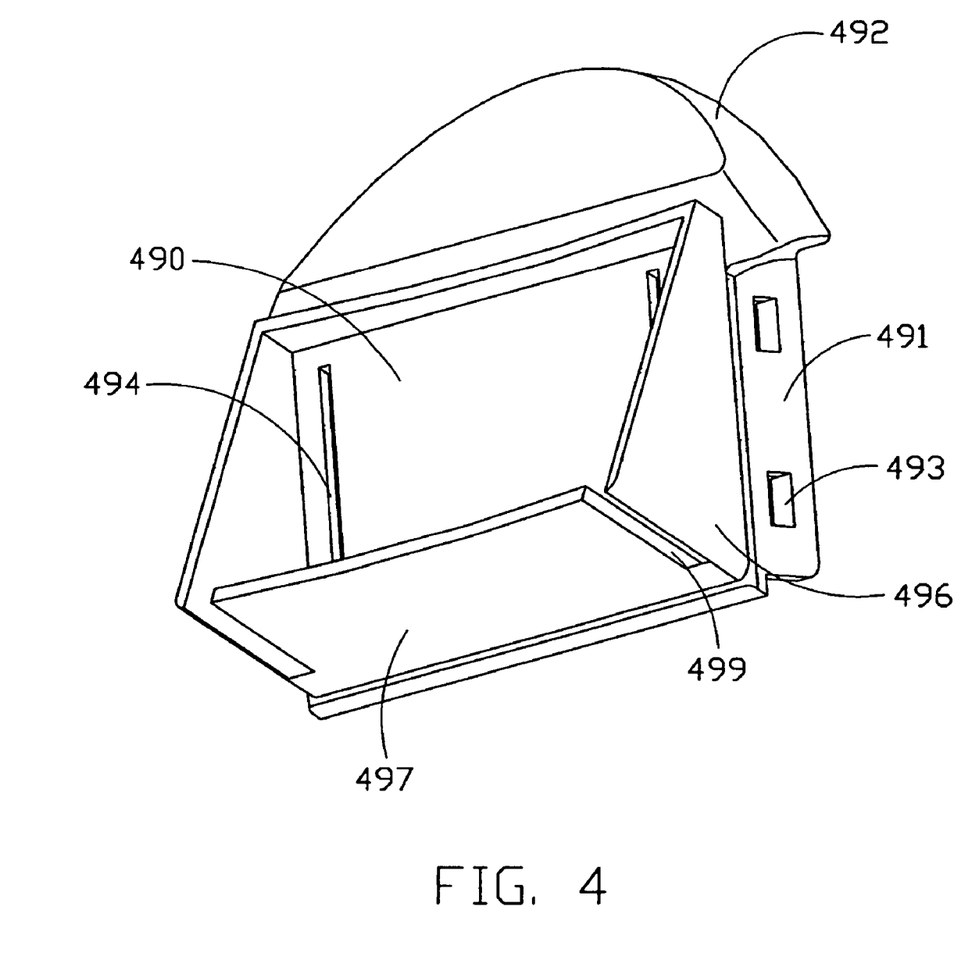
FIG. 4 is a perspective view of a cover of the first pivot assembly of FIG. 3, but viewed from another aspect.

Referring to FIGS. 2 to 4, the first pivot assembly 40 comprises a pair of supporting boards 42, a pivoting board 44, a pair of ring-shaped friction gaskets 45, a first pivot 46, a pair of first damper 48, and a cover 49.

The supporting board 42 has a generally L shape, and comprises a locking portion 422 and a supporting portion 424 bent vertically from an end of the locking portion 422. A plurality of mounting holes 426 is defined in the locking portion 422 at a position corresponding to the threaded holes 12 of the monitor 10. An oblique slot 429 is defined in the vicinity of a free end of the supporting portion 424.

The pivoting board 44 has a generally U shape, and comprises a bottom portion 442 and two connecting portions 444 bent vertically from two opposite sides of the bottom portion 442. A plurality of mounting holes 446 is defined in the bottom portion 442 and a pivot hole 448 is defined in each connecting portion 444.

Each friction gasket 45 is to be assembled between the supporting board 42 and the pivoting board 44. The friction gasket 45 can generate a friction moment when the supporting board 42 rotates around the pivoting board 44.

The first pivot 46 defines two grooves 462 in two distal ends along an axial direction respectively. A locking aperture 464 is defined across the first pivot 46 and communicates with each groove 462.

A first positioning post 483 is formed at an end of each first damper 48, and a cap 485 is formed at the opposite end of said first damper 48. The first positioning post 483 can extend through the slot 429 of the supporting board 42, the friction gasket 45, the pivot hole 448 of the pivoting board 44, and then insert into the groove 462 of the first pivot 46. A locking hole 484 is defined in the first positioning post 483 corresponding to the corresponding locking aperture 464 of the first pivot 46. Two screw holes 486 are defined in the locking board 485. The first positioning post 483 can steadily rotate relative to the cap 485 under an action of a torque moment.

The cover 49 comprises a base board 490, and two flanges 491 bent vertically from two opposite sides of the base board 490 respectively. The flanges 491 are connected by a top portion 492. A bottom plate 497 and two opposite side walls 496 extend rearwards from three edges of the base board 490, respectively. Two parallel through splits 494 are defined in the base board 490 parallel with the flanges 491. The bottom plate 497 defines two slits 499 corresponding to the splits 494 of the base board 490.

Figure 5:
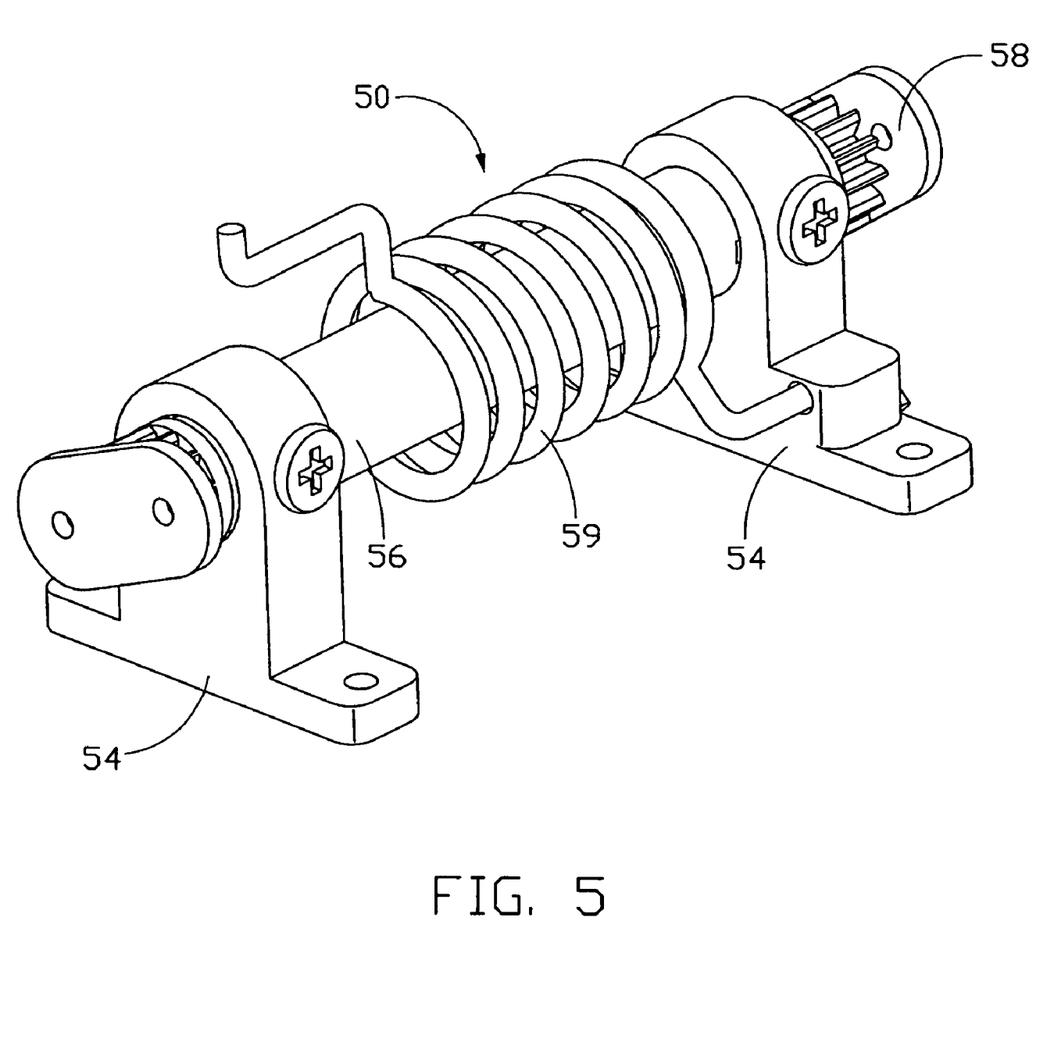
FIG. 5 is an enlarged view of a second pivot assembly of the adjusting device of FIG. 1.
Figure 6:
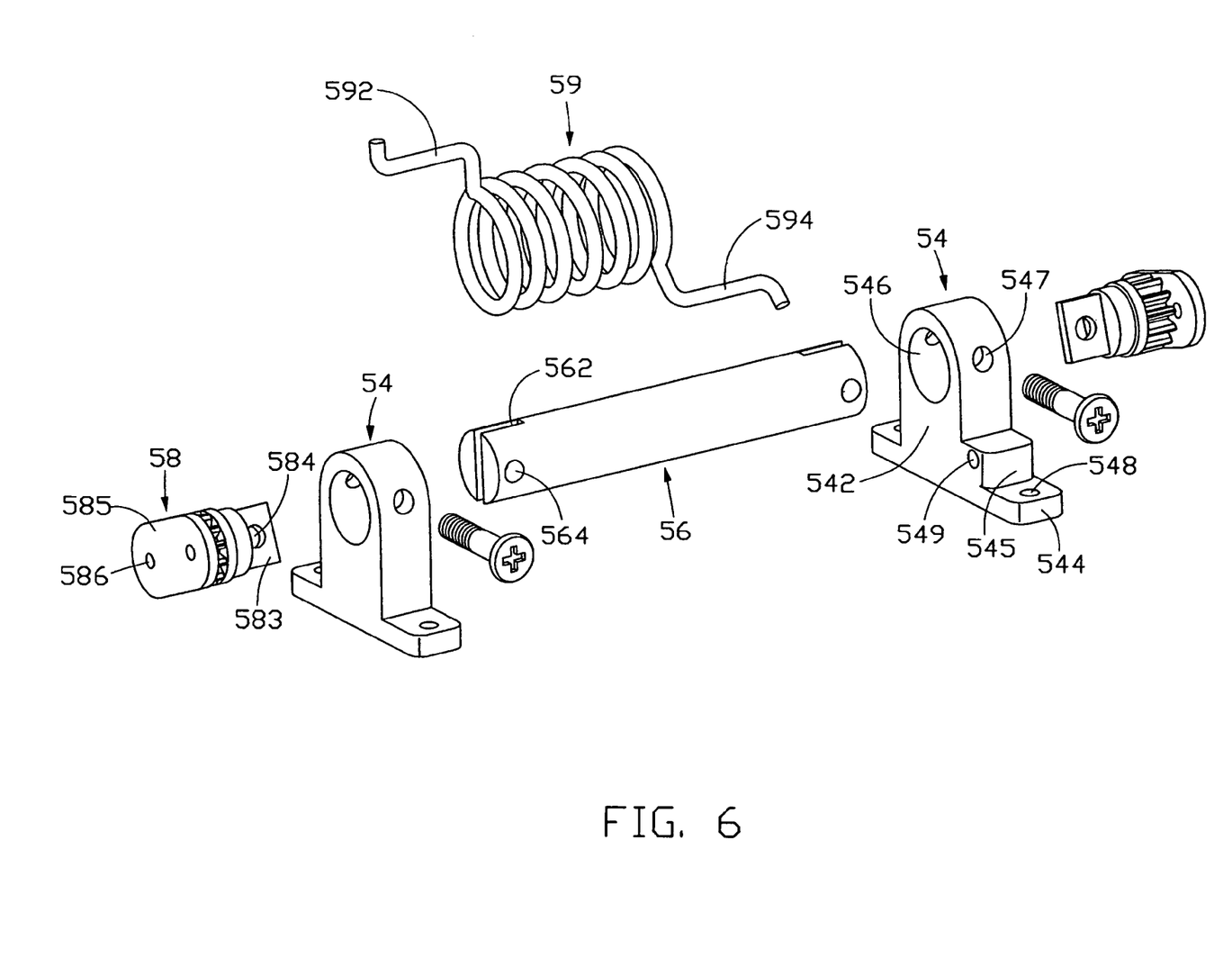
FIG. 6 is an exploded perspective view of the second pivot assembly of FIG. 5.

Referring to FIGS. 5 and 6, the second pivot assembly 50 comprises two supporting seats 54, a second pivot 56, a pair of second dampers 58, and a torque-limiting spring 59.

The supporting seats 54 are to be assembled on the base 20. Each supporting seat 54 is generally T-shaped, and comprises a base portion 544 defining a pair of through holes 548 therein, and a main body 542 extending upwardly from the base portion 544 defining an assembly hole 546 therein. A through hole 547 is defined in the main body 542 perpendicularly communicating with the assembly hole 546. A block 545 defining a fixing hole 549 is formed on the base portion 544 at one side of the main body 542.

The second pivot 56 defines two grooves 562 in two distal ends respectively, along an axial direction. Two locking apertures 564 are defined across the second pivot 56, and communicate with corresponding grooves 562.

A second positioning post 583 extends from an end of each second damper 58. A locking hole 584 is defined in the second positioning post 583 corresponding to the locking aperture 564 of the second pivot 56. A cap 585 is formed on the other end of the second damper 58 and defines two screw holes 586 therein. The cap 585 can steadily rotate relative to the second positioning post 583 under a torque moment.

The torque-limiting spring 59 is set around the second pivot 56 and can generate a torque moment under an applied force. The torque-limiting spring 59 comprises two clasp arms 592, 594.

Referring back to FIG. 1, the connecting assembly 70 comprises a bracket 72, a connecting board 74, a locking board 76, and four connecting poles 78.

A bigger cutout 723 is defined in an upper end at a central position of the bracket 72. Two smaller cutouts 724 are defined in a bottom end of the bracket 72. A clasp 726 is formed outwardly at a bottom of an opening 725 of the bracket 72. A plurality of screw seats 727 is formed between the cutout 723 and the opening 725. Two sets of locking holes 728 are defined adjacent the bottom of the opening 725 at two opposite sides.

The connecting board 74 is to connect the bracket 72 and the first pivot assembly 40 together. Two sets of threaded apertures 742, 744 are defined in the connecting board 74, corresponding to the mounting holes 446 of the pivoting board 44 and the screw seats 727 of the bracket 72 respectively.

The locking board 76 comprises a locking portion 762 and a locking strip 764 bent vertically from the locking portion 762. A plurality of through apertures 766 is defined in the locking portion 762 corresponding to the threaded apertures 728 of the bracket 72. A plurality of through holes 768 is defined in the locking strip 764 corresponding to the screw holes 586 of the cap 585 of the second damper 58.

The connecting poles 78 are used to connect the first damper 48 and the second damper 58 together. A pair of bores 782 and 784 is defined in a top end and a bottom end of the connecting pole 78 respectively, corresponding to the screw holes 486 of the first damper 48 and the screw holes 586 of the second damper 58, respectively.

In assembly, firstly, the first pivot assembly 40 and the second pivot assembly 50 are assembled respectively. Secondly, the first pivot assembly 40 and the second pivot assembly 50 are connected by the connecting assembly 70 to compose the adjusting device 30. Finally, the adjusting device 30 is assembled to the monitor 10 and the base 20. The process is described in detail below.

In assembling the first pivot assembly 40, the first pivot 46 extends through the two pivot holes 448 of the pivoting board 44. Then the friction gaskets 45 are placed around both ends of the first pivot 46. The supporting portions 424 of the supporting board 42 are inserted through the splits 494 of the cover 49. Then the first positioning post 483 of each first damper 48 extends through the slot 429 of the corresponding supporting board 42, and is inserted into the groove 462 of the first pivot 46. At the time, the locking hole 484 of the first positioning post 483 should be in an alignment with the corresponding locking aperture 464 of the first pivot 46. Finally, a screw (not labeled) is engaged into the locking aperture 464 and the locking hole 484. The first pivot assembly 40 is thus assembled.

In assembling the second pivot assembly 50, the toque-limiting spring 59 is set around the second pivot 56. Then each end of the second pivot 56 is inserted into the assembly hole 546 of the corresponding supporting seat 54. Thereafter the second positioning post 583 of each second damper 58 is inserted into the groove 562 of the second pivot 56. The locking hole 584 of each second positioning post 583 should be in an alignment with the corresponding locking aperture 564 of the second pivot 56 and the through holes 547 of the corresponding supporting seat 54. A screw (not labeled) extends through the through holes 547, the locking aperture 564, and the locking hole 584 in turn. The second dampers 58 and the second pivot 56 are thus fastened to the supporting seats 54. Thereafter, the clasp arm 594 of the torque-limiting spring 59 is adjusted to extend through the fixing hole 549 of the supporting seat 54 and then clasp the outer side of the lock 545.

Figure 7:
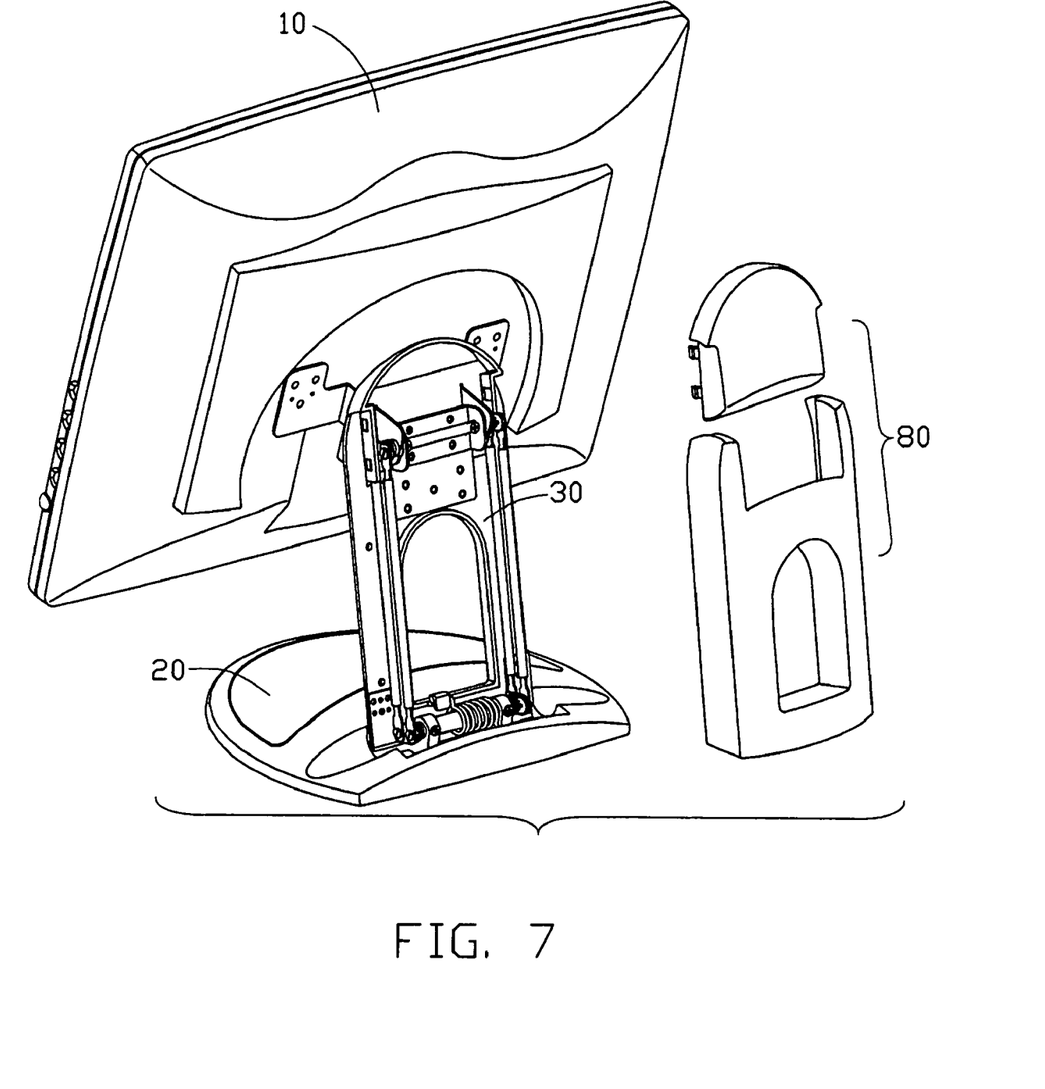
FIG. 7 is an assembled view of FIG. 1, together with a protecting cover.

The next step is connecting the first pivot assembly 40 and the second pivot assembly 50 together by the connecting assembly 70. Referring to FIG. 7, firstly, a plurality of screws extends through the through apertures 744 of the connecting board 74 and engages with the screw seats 727 of the bracket 72. Then a plurality of screws extends through the through apertures 766 of the locking board 76 and engages in the threaded apertures 728 of the bracket 72. Secondly, a plurality of screws (not shown) extends through the mounting holes 446 of the first pivot assembly 40 and engages in the through apertures 742 of the connecting board 74. Then a plurality of screws (not labeled) extends through the bores 782 of the connecting poles 78, and engages in the screw holes 486 of the first damper 48, and a plurality of screws extends through the bores 784 of the connecting poles 78 and the through holes 768 of the locking boards 76, and engages in the screw holes 586 of the second damper 58. Finally, the other clasp arm 592 of the second damper 58 engages with the clasp 726 of the bracket 72. Thus both the first pivot assembly 40 and the second pivot assembly 50 are connected with the connecting assembly 70 to compose the adjusting device 30.

The last step is connecting the monitor 10 to the base 20 by the adjusting device 30. Firstly, the supporting seats 54 are mounted on the base 20 by a plurality of screws (not shown). Secondly, a plurality of screws (not shown) extends through the mounting holes 426 of the supporting boards 42 of the first pivot assembly 40, and engages in the corresponding threaded holes 12 of the monitor 10. Thus, the monitor 10 is connected to the base 20 by the adjusting device 30.

Figure 8:
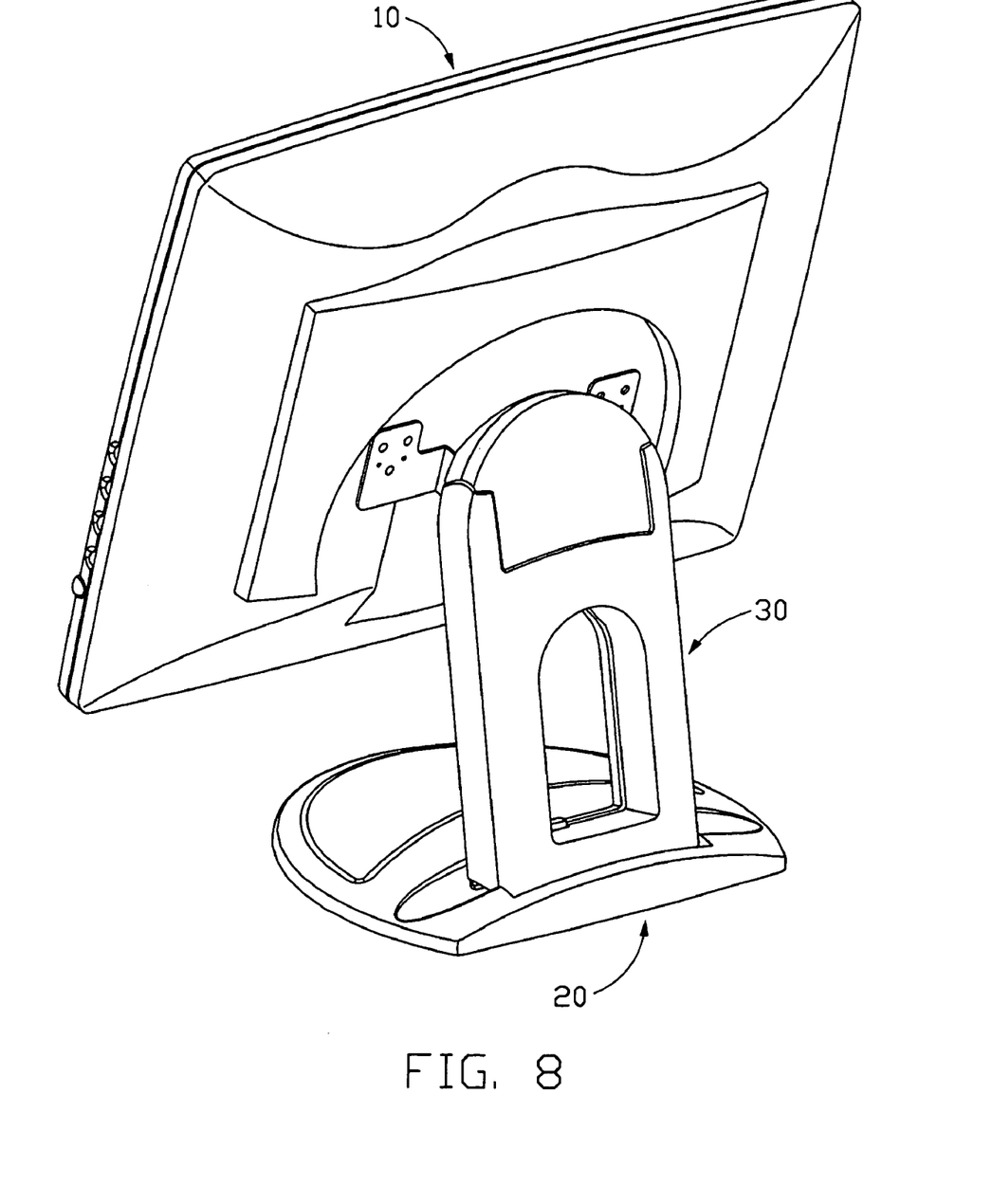
FIG. 8 is an assembled view of FIG. 7, showing the protecting cover being attached to the adjusting device.

Referring to FIG. 8, the adjusting device 30 can be covered with a protecting cover 80 for ornamental and dustproof propose. The protecting cover 80 can further secure the first pivot assembly 40.

In adjusting the obliquity of the monitor 10 relative to the base 20, a user can rotate the monitor 10 while maintaining the ubiety between the connecting assembly 70 and the base 20. The monitor 10 generates a first gravity moment to the first pivot assembly 40. Because the supporting boards 42 of the first pivot assembly 40 are attached to the monitor 10, and the pivoting board 44 is attached to the connecting board 74 of the connecting assembly 70 which is immovable, the monitor 10 is rotated with the supporting boards 42 rotating relative to the pivoting board 44. The friction gaskets 45 rub against the connecting portions 444 of the pivoting board 44 and the supporting portions 424 of the supporting boards 42 to generate a friction moment opposite to the first gravity moment. The supporting board 42 will stay at any position under a balance of the friction moment and the gravity moment. Thus the obliquity of the monitor 10 is adjusted. The slits 499 of the cover 49 can prevent the supporting portions 424 from interfering with the bottom plate 497 of the cover 49. The first positioning posts 483 of the first damper 48 are rotated along with the supporting portions 424, and the caps 485 are connected to the connecting poles 78, so the first positioning posts 483 are rotated relative to the caps 485. A torque moment is generated between the first positioning post 483 and the cap 485 of each first damper 48, for steadying the rotation of the monitor 10 and absorbing the vibration during rotation.

In adjusting the height of the monitor 10 relative to the base 20, a user can rotate the connecting assembly 70 together with the monitor 10 while maintaining the obliquity of the monitor 10 relative to the connecting assembly 70. The monitor 10 and the connecting assembly 70 generate a second gravity moment to the second pivot assembly 50. The torque-limiting spring 59 is clasped between the clasp 726 of the bracket 72 and the fixing hole 549 of the supporting seat 54. Therefore when the connecting assembly 70 rotates, the torque-limiting spring 59 generates a torque moment opposite to the second gravity moment under the action of the bracket 72 and the supporting seat 54. The monitor 10 will stay at any position under a balance of the torque moment and the second gravity moment. Thus the height of the monitor 10 is adjusted. Furthermore, the first pivot 56 with the second positioning post 583 secured thereto is secured with the supporting seat 54 so as not to rotate with the connecting assembly 70. As a consequence, the cap 585 of each second damper 58 is driven by the rotation of the bracket 72 to rotate relative to the second positioning post 583, so that the connecting assembly 70 together with the monitor 10 can turn gently and steadily via the action of the second dampers 58. Vibrations during rotation are eliminated by the second dampers 58. The cutouts 724 of the bracket 72 are in alignment with the supporting seats 54 to prevent interfering during the rotation of the bracket 72.

It is understood that the invention may be embodied in other forms without departing from the spirit thereof. Thus, the present examples and embodiments are to be considered in all respects as illustrative and not restrictive, and the invention is not to be limited to the details given herein.

What is claimed is:

1. An adjusting assembly comprising:
a monitor;
a base;
a first pivot assembly comprising a pair of supporting boards attached to the monitor, a pivoting board pivotally mounted between the supporting boards via a first pivot, and a pair of friction gaskets mounted between the supporting boards and the pivoting board, the friction gaskets rub by the supporting board and the pivoting board, wherein when the monitor rotates relative to the pivoting board, the friction gaskets rub against the supporting boards and the pivoting board and generate a friction moment, the monitor generates a first gravity moment opposite to the friction moment;
a second pivot assembly having a pair of supporting seats attached to the base, and a second pivot pivotally attached to the supporting seats, a torque-limiting spring placed around the second pivot between the supporting seats with one clasp end engaging with one of the supporting seats; and
a connecting assembly mounted between the first pivot assembly and the second pivot assembly, the other clasp end of the torque-limiting spring engaging with the connecting assembly, wherein the torque-limiting spring generates a torque moment under a rotation action between the connecting assembly and the second pivot assembly, the monitor and the connecting assembly generate a second gravity moment opposite to the torque moment;
wherein the monitor stays at any obliquity under a balance of the friction moment and the first gravity moment, and stays at any height under a balance of the torque moment and the second gravity moment.

2. The adjusting assembly as claimed in claim 1, wherein the first pivot assembly further comprises a pair of first dampers, each of the first dampers has a first positioning post unrotatably connecting a corresponding supporting board, a corresponding friction gasket, and one end of the first pivot, a first cap defining a plurality of first screw holes is formed on each of the first dampers.

3. The adjusting assembly as claimed in claim 2, wherein the second pivot assembly comprises a pair of second dampers, each of the second dampers has a second positioning post unrotatably connecting one end of the second pivot, and a second cap defining a plurality of second screw holes.

4. The adjusting assembly as claimed in claim 3, wherein the connecting assembly further comprises two pairs of connecting poles for connecting the first damper and the second damper together, a pair of bores is defined in a top end and a bottom end of each of the connecting poles respectively, corresponding to the first screw holes of the first damper and the second screw holes of the second damper, respectively.

5. The adjusting assembly as claimed in claim 2, wherein a slot is defined in said supporting board, a first groove and a first locking aperture communicating with each other are defined in said end of the first pivot, a first locking hole is defined in the first positioning post, the first positioning post extends through the slot and the first groove, a screw extends through the first locking aperture and the first locking hole.

6. The adjusting assembly as claimed in claim 5, wherein each of the supporting boards comprises a locking portion, and a supporting portion bent vertically from the locking portion attached w the monitor, the slut is defined in the supporting portion.

7. The adjusting assembly as claimed in claim 1, wherein the pivoting board comprises a bottom portion attached to an upper portion of the connecting assembly, and two connecting portions bent vertically from two opposite sides of the bottom portion, a pivot hole is defined in each of the connecting portions for extension of the first pivot.

8. The adjusting assembly as claimed in claim 3, wherein a second groove and a second locking aperture communicating with each other are defined in said end of the second pivot, a second locking bole is defined in the second positioning post, the second positioning post engages in the second groove.

9. The adjusting assembly as claimed in claim 8, wherein an assembly hole is defined in each supporting seat for extension of the second pivot, a through hole is defined in the supporting seat vertically communicating with the assembly hole, a screw extends through the through hole, the second locking aperture and the second locking hole.

10. The adjusting assembly as claimed in claim 1, wherein a fixing hole is defined in said one of the supporting seats, said one of the clasp arms extends through the fixing hole.

11. The adjusting assembly as claimed in claim 1, wherein the connecting assembly comprises a bracket, a clasp is formed outwardly at a bottom of the bracket, said other clasp end of the torque-limiting spring is engaged in the clasp.

12. The adjusting assembly as claimed in claim 11, wherein the connecting assembly further comprises a pair of locking boards, the locking boards are connected to the bracket and the second cap of the second pivot assembly.

13. A monitor adjusting apparatus comprising:
a monitor;
a base; and
an adjusting device connected between the monitor and the base for adjusting an obliquity and a height of the monitor relative to the base, the adjusting device comprising:
a first pivot assembly connected with the monitor, the first pivot assembly comprising a pair of supporting boards attached to the monitor, a pivoting board pivotable relative to the supporting boards, and a pair of friction gaskets mounted between the supporting boards and the pivoting board for generating a friction moment, the monitor generating a first gravity moment opposite to the friction moment:
a second pivot assembly connected with the base, the second pivot assembly comprising at least a torque-limiting spring with two clasp ends formed thereon, one of the clasp ends being fixed with respect to the base; and a connecting assembly mounted between the pivoting board of the first pivot assembly and the second pivot assembly, the other clasp end of the torque-limiting spring wedging in the connecting assembly, the torque-limiting spring generating a twist moment under an action of the connecting assembly and the second pivot assembly, the monitor, the first pivot assembly and the connecting assembly generate a second gravity moment opposite to the twist moment;
wherein the monitor is located at any obliquity via the balance of the friction moment and the first gravity moment, and located at any height via the balance of the twist moment and the second gravity moment.

14. The monitor adjusting apparatus as claimed in claim 13, wherein the first pivot assembly further comprises a first pivot via which the pivoting board is pivotally mounted between the supporting boards, and a pair of first dampers, the first pivot defines two grooves in two distal ends thereof along an axial direction respectively, a locking aperture is defined across the first pivot and communicates with each groove, each first damper comprises a positioning post engaging in the groove of the first pivot, and a locking hole is defined in the positioning post corresponding to the locking aperture of the first pivot.

15. The monitor adjusting apparatus as claimed in claim 13, wherein the second pivot assembly further comprises a pair of supporting seats attached to the base, and a second pivot pivotally attached to the supporting seats, the torque-limiting spring is placed around the second pivot between the supporting seats with said one clasp end engaging with one of the supporting seats.

16. The monitor adjusting apparatus as claimed in claim 13, wherein the connecting assembly comprises a bracket and a connecting board mounted between an upper end of the bracket and the pivoting board of the first pivot assembly, a clasp is formed on a lower end of the bracket, said other clasp end of the torque-limiting spring is engaged in the clasp.

17. A monitor adjusting apparatus comprising:
a monitor generating a first gravity moment;
a base; and
an adjusting device connected between the monitor and the base for adjusting an obliquity and a height of the monitor relative to the base, the adjusting device comprising:
a first pivot assembly comprising a supporting member attached to the monitor, a pivoting member pivotable relative to the supporting member, a first moment generating member mounted between the supporting member and the pivoting member for generating a first moment opposite to the first gravity moment when the monitor and the supporting member is rotated relative to the pivoting member;
a second pivot assembly comprising a seat fixed with respect to the base;
a connecting assembly having one portion attached in the pivoting member and another portion pivotably attached relative to the seat, the monitor, the first pivot assembly and the connecting assembly generating a second gravity moment; and
a second moment generating member mounted between said another portion of the connecting assembly and the seat for generating a second moment opposite to the second gravity moment when the connecting assembly is rotated relative to the seat;

wherein the monitor is capable of staying at a variety of obliquities via the balance of the first moment and the first gravity moment, and staying at a variety of height via the balance of the second moment and the second gravity moment;

wherein the first pivot assembly comprises a first damper comprising a first positioning post attached to the supporting member, and a first cap pivotable relative to the positioning post, the second pivot assembly comprises a second damper comprising a second positioning post fixed with respect to the seat, and a second cap pivotable relative to the positioning post, whereby a connecting pole is connected between the caps of the first and second damper for steadying movement of the monitor and the connecting member.

18. The monitor adjusting apparatus as claimed in claim 17, wherein the first moment generating member comprises a friction gasket sandwiched between the supporting member and the pivoting member.

19. The monitor adjusting apparatus as claimed in claim 17, wherein the second moment generating member comprises a torque-limiting spring with two clasp ends respectively engaging with said another portion of the connecting assembly and the seat.

* * * * *